US008145209B2

(12) United States Patent
Hwang et al.

(10) Patent No.: US 8,145,209 B2
(45) Date of Patent: Mar. 27, 2012

(54) APPARATUS AND METHOD FOR DELIVERING STREAM IN A MOBILE BROADCAST SYSTEM

(75) Inventors: Sung-Oh Hwang, Yongin-si (KR); Ji-Hye Lee, Seoul (KR); Eun-Jung Kim, Suwon-si (KR); Bo-Sun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1759 days.

(21) Appl. No.: 11/394,201

(22) Filed: Mar. 31, 2006

(65) Prior Publication Data
US 2006/0248211 A1 Nov. 2, 2006

(30) Foreign Application Priority Data

Apr. 2, 2005 (KR) .................. 10-2005-0027834

(51) Int. Cl.
*H04Q 7/20* (2006.01)
(52) U.S. Cl. .................. 455/432.1; 726/4; 713/163
(58) Field of Classification Search ............. 455/432.1, 455/422.1; 713/163
See application file for complete search history.

(56) References Cited

U.S. PATENT DOCUMENTS

| 6,026,289 | A  | 2/2000 | Zellner et al. |
| 6,741,856 | B2 | 5/2004 | McKenna et al. |
| 6,859,501 | B1 | 2/2005 | Zimmermann et al. |
| 2004/0223513 | A1* | 11/2004 | Meago ........................... 370/468 |
| 2005/0281270 | A1* | 12/2005 | Kossi et al. ................ 370/395.5 |
| 2006/0030312 | A1* | 2/2006 | Han et al. .................... 455/432.1 |
| 2006/0092902 | A1* | 5/2006 | Schmidt ........................ 370/342 |
| 2006/0206708 | A1* | 9/2006 | Son et al. ....................... 713/163 |

FOREIGN PATENT DOCUMENTS

| JP | 2005-057326 | 3/2005 |
| RU | 2149518 C1 | 5/2000 |
| RU | 2192095 C2 | 10/2002 |
| TW | 454394 | 9/2001 |
| TW | 589841 | 6/2004 |
| WO | WO 2004/023748 A1 | 3/2004 |
| WO | WO 2004023748 A1 | 3/2004 |
| WO | WO 2004/042972 A2 | 5/2004 |
| WO | WO 2004/088983 A2 | 10/2004 |

(Continued)

OTHER PUBLICATIONS

OMA: "Technical Broadcast Services Architecture", Open Mobile Alliance, XP007915356, Draft Version 1.0—Feb. 7, 2005, OMA-AD-BCAST-V1_0-20050207-D.

(Continued)

*Primary Examiner* — Phuoc Doan
(74) *Attorney, Agent, or Firm* — Roylance, Abrams, Berdo & Goodman, LLP

(57) ABSTRACT

A method and system are provided for delivering a stream in a mobile broadcast system that receives stream contents of broadcast services (BCAST) from a content creation and provides the broadcast services to one terminal or one group of terminals via one of a broadcast distribution system (BDS) and an interaction network. The method involves requesting assignment of a bearer in which the stream is to be delivered, assigning a bearer in response to the bearer assignment request, adapting the stream to be appropriate for the assigned bearer, and delivering the adapted stream to the terminal in the assigned bearer.

40 Claims, 6 Drawing Sheets

FOREIGN PATENT DOCUMENTS

WO   WO 2004088983 A2   10/2004
WO   WO 2005/022852 A1   3/2005

OTHER PUBLICATIONS

GSM, "3rd Generation Partnership Project", Technical Specification Group Services and System Aspects, Multimedia Broadcast/Multicast Service (MBMS), Protocols and Codecs (Release 6), XP050370271, 3GPP TS 26.346, V6.0.0 (Mar. 2005).

OMA: "Mobile Broadcast Services Architecture", Open Mobile Alliance, Draft Version 1.0—Mar. 15, 2005, OMA-AD_BCAST-V1_0-20050315-D, XP007915356.

* cited by examiner

APPARATUS AND METHOD FOR DELIVERING STREAM IN A MOBILE BROADCAST SYSTEM

PRIORITY

This application claims the benefit under 35 U.S.C. §119(a) of a Korean Patent Application filed in the Korean Intellectual Property Office on Apr. 2, 2005 and assigned Serial No. 2005-27834, the entire disclosure of which is hereby incorporated by reference.

BACKGROUND OF THE INVENTION

1. Field of the Invention

The present invention relates generally to a stream delivery apparatus and method for receiving broadcasts in a mobile broadcast system. More particularly, the present invention relates to a stream delivery apparatus and method for efficiently receiving streams at a mobile terminal in a mobile broadcast system.

2. Description of the Related Art

The mobile communication market continues to create new services through recombination or integration of the existing technologies. With the recent development of the communication and broadcast technologies, the broadcast system or the mobile communication system is now in the phase of providing broadcast service using mobile terminals such as cellular phone and Personal Digital Assistance (PDA). Live discussions are made not only on the common broadcast service limited to the voice and image, but also on Mobile Broadcast Service (BCAST) capable of transmitting packet data over a broadcast channel.

Mobile Broadcast Service can include processes of discovering a service by a mobile terminal capable of receiving Mobile Broadcast Service, subscribing to the service by the mobile terminal, providing various control information for receiving the service, transmitting the service, and receiving the service by the mobile terminal.

FIG. 1 is a diagram illustrating a logical architecture for a mobile broadcast system proposed by BCAST working group of Open Mobile Alliance (OMA) that has established the technical standard for Application Layer and its lower Transport Layer and Network Layer for Mobile Broadcast Service. That is, FIG. 1 illustrates the BCAST network architecture supporting Mobile Broadcast Service. Herein, FIG. 1 illustrates the architecture for OMA BCAST Service, which is an OMA Mobile Broadcast Service standard.

In OMA BCAST, the technical fields and functions being discussed for Mobile Broadcast Service include a service guide having information on Mobile Broadcast Service, necessarily required for discovering Mobile Broadcast Service, service recovery, streaming and file distribution, service and content protection, service provisioning, interaction between a mobile broadcast network and a cellular network, and notification capable of indicating a start of Mobile Broadcast Service and a change in Mobile Broadcast Service. These functions are located in BCAST logical entities shown in FIG. 1. A description will now be made of the logical entities constituting the mobile broadcast system shown in FIG. 1. The logical entities shown in FIG. 1 are shown in Table 1, and interfaces between the entities are shown in Table 2.

TABLE 1

| No. | Entity name | Functionality |
|-----|-------------|---------------|
| 102 | BCAST Service Application (BSA) | Represents the service application of the BCAST Service, such as streaming audio/video or movie file download. It encompasses the functionality of media encoding, content protection and interaction related to BCAST Service. It also provides the BCAST service attributes to the BCAST Service Distribution/Adaptation and BCAST Subscription Management. It may generate charging information, for example, according to the user charging information that it obtains from the BCAST subscription management and the content creator. Legacy mechanisms may be used for charging information generation and delivery. |
| 103 | BCAST Service Distribution/Adaptation (BSD/A) | Responsible for the aggregation and delivery of BCAST Services, and performs the adaptation of the BCAST Enabler to underlying Broadcast Distribution Systems. It provides the functionality of File and Stream Distribution, Service Aggregation, Service Protection, Service Guide generation and delivery, Notification Delivery, and the adaptation to the underlying BDS. The functionality of adaptation to each BDS may vary depending on the underlying BDS. |
| 104 | BCAST Subscription Management (BSM) | Responsible for service provisioning such as subscription and payment related functions, the provision of information used for BCAST Service reception, and BCAST Terminal management. It provides the functionality of Notification, Service Protection management, Content Protection management, Service Guide generation support, Terminal Provisioning and interaction with the BDS Service Distribution to communicate/manage subscription information with the Terminal. It may send the user charging information to the BCAST service application. |
| 105 | Terminal | The user device that receives broadcast content as well as the BCAST service related information, such as, service guide, content protection information. The user device may support the interactive channel in which case it would be able to directly communicate to the network regarding the available services. |
| 101 | Content Creation (CC) | Source of content, may provide support for delivery paradigms (e.g. streaming servers); provides base material for content descriptions. |
| 111 | BDS Service Distribution | Responsible for the coordination and delivery of broadcast services to the BDS for delivery to the terminal, including file and stream distribution, and Service Guide distribution. It may also include key |

TABLE 1-continued

| No. | Entity name | Functionality |
|---|---|---|
| | | distribution, broadcast subscription management, and accounting functions. BDS Service Distribution may not exist in certain BDSs. In that case it would be considered a "Null Function". It works with the interactive network to perform service discovery, BDS-specific service protection and handles other interaction functions. It also works with the BDS for content delivery to the terminal. |
| 112 | Broadcast Distribution System (BDS) | Specific support for the distribution of content over the broadcast channel. This may involve the same or different radio network from that used by the interactive channel. |
| 113 | Interaction Network | Specific support for the interaction channel. This may involve the same or different radio network from that used by the broadcast channel. |

TABLE 2

| No. | Reference point name | Usage |
|---|---|---|
| 121 | BCAST-1 | Content, Content attributes, notification event, etc. |
| 122 | BCAST-2 | Content-unprotected and/or content-protected BCAST Service, BCAST Service attributes and content attributes. |
| 123 | BCAST-3 | BCAST Service attributes and content attributes, User preference and subscription information. User request, User reporting, notification event and maybe user charging information |
| 124 | BCASTA-4 | Notification, Service Guide, fragments (related to provisioning, purchasing, subscription, terminal provisioning, etc.), Service keys, Terminal Provisioning object, Terminal Provisioning message, Terminal management message, etc. |
| 125 | BCAST-5 | Unprotected and/or protected BCAST Service, content-unprotected and/or content-protected BCAST Service, BCAST Service attributes and content attributes, Notification, Service Guide, Security material, all distributed over the Broadcast Distribution System. |
| 126 | BCAST-6 | Unprotected and/or protected BCAST Service, content-unprotected and/or content-protected BCAST Service, BCAST Service attributes and content attributes, Notification, Service Guide, Security material, terminal reports related to stream and file delivery, all distributed over the Interaction Network. |
| 127 | BCAST-7 | Service provisioning, Subscription information, Terminal provisioning, Security material and device registration. |
| 128 | BCAST-8 | User interaction, reporting, and user preference |
| 129 | BDS-1 | Unprotected and/or protected BCAST Service, content-unprotected and/or content-protected BCAST Service, BCAST Service attributes and content attributes, BDS-specific attributes, Notification and Service Guide fragments Note: Service protection or Content Protection of RTP streams may be employed by the BDS itself, if available. |
| 130 | BDS-2 | Service provisioning, Subscription information, Device management, Security material. |
| 131 | X-1 | Reference Point between BDS Service Distribution and BDS |
| 132 | X-2 | Reference Point between BDS Service Distribution and Interaction Network |
| 133 | X-3 | Reference Point between BDS and Terminal |
| 134 | X-4 | Reference Point between BDS Service Distribution and Terminal over Broadcast |
| 135 | X-5 | Reference Point between BDS Service Distribution and Terminal over Interaction Channel |
| 136 | X-6 | Reference Point between Interaction Network and Terminal |

In the description of Table 2, 'reference point' indicates a connection path between two particular logical entities and can have a plurality of interfaces according to its object. The interfaces are used for communication between two or more functional entities for a particular object, and message types and protocols for the object are used.

FIG. 2 is an exemplary Stream Distribution Function architecture for improving BCAST Streaming Service in OMA BCAST, which is an OMA Mobile Broadcast standard organization.

The Stream Distribution Function converts voice and image data into streams having BCAST standard CODEC or Broadcast Distribution System (BDS) standard CODEC and distributes the converted streams to terminals. The Stream Distribution Function mainly distributes the streams over a broadcast channel, but can also transmit the streams to terminals over an interaction channel when the number of the terminals is smaller.

In addition, the Stream Distribution Function may use service protection capability provided by a Service Protection Function to prevent a terminal or user unauthorized to receive a streaming service from receiving the streaming service, thereby protecting data streams. The Stream Distribution Function may provide an error resilience function in which the terminal can correct a possible stream data error occurring in a wireless environment, using a Forward Error Correction (FEC) technique.

A description of the logical entities and interfaces shown in FIG. 2 is given in Table 3. OMA BCAST configures three sub-functional entities to implement the Stream Distribution Function.

The sub-functional entities include a Stream Application Function, Stream Delivery Function, and Stream Delivery Client Function.

A Content Creation (CC) 101 provides voice or image data to be transmitted as BCAST Streaming Service, and the voice or image data can optionally be a stream that is encoded using BCAST standard media type and CODEC. Further, the CC 101 provides an attribute for the data so that a Stream Application Function (SA) 202 and a Stream Delivery Function (SD) 203 can perform necessary operations, and the attribute may be used for generating a service guide used for an OMA BCAST service guide.

The SA 202 provides a streaming service having BCAST standard media type and CODEC to a plurality of users or user terminals. The SA 202 receives transmission data for the streaming service from the CS 101. The data may have the CODEC and media type defined in OMA BCAST. Otherwise, the data undergoes a translation operation in the SA 202. After completion of the translation operation, the SA 202 delivers the BCAST-standardized stream to the SD 203, along with an attribute for the standardized stream. An exemplary attribute of the standardized stream may include a media type of the stream, a CODEC used, a data-related attribute such as a required rate, a preferred age group for the streaming service, a service area, and the like.

The SD 203 receives the BCAST-standardized stream from the SA 202, and delivers the stream to a plurality of users or user terminals. Accordingly, the SD 203, together with a BDS 112, performs a process of determining a bearer capable of delivering the standardized stream. Further, the SD 203 performs an operation of translating the stream into a streaming service appropriate for the BDS 112, upon receiving a request from the BDS 112. There are two possible methods for delivering streams by the SD 203:

BDS transparent mode: An OMA BCAST-standardized stream is directly delivered in OMA BCAST. In this instance, the BDS 112 provides the bearers and wire/wireless resources to be used for actual transmission, and performs no other function. The SD 203 negotiates bearers to be used for stream delivery in cooperation with a BDS Service Distribution 111 through an SD-B1 interface 217 to deliver the OMA BCAST-standardized stream. If the BDS Service Distribution 111 does not exist, an X-1 interface 131 or an X-2 interface 132 can be used instead of the SD-B1 interface 217. If the bearers are determined, the SD 203 delivers the OMA BCAST-standardized stream to a plurality of terminals via an SD-5 interface 215.

BDS assisted mode: The SD 203 provides the OMA BCAST-standardized stream or stream data to the BDS 112, and the BDS 112 delivers the stream to a plurality of users or user terminals through a translation process appropriate for the BDS characteristics. For the stream delivery, the SD-B1 interface 217 is used. Upon receiving the stream via the SD-B1 interface 217, the BDS Service Distribution 111 distributes the stream to a plurality of users or user terminals after an appropriate translation process.

In addition, the SD 203 can translate the OMA BCAST stream into a BDS-specific stream in response to a BDS request, and also change a reproduction rate of the stream data according to the network condition of the BDS 112. Further, the SD 203 has a function of protecting a streaming service by using a Service Protection Function to prevent a user or user terminal unauthorized to receive the streaming service from receiving the streaming service, and also a function of delivering signaling information used for reception of the streaming service. In addition, the SD 203 can provide various types of Forward Error Correction (FEC) techniques capable of reducing a delivery error rate of the streaming service taking the wireless channel environment into account.

A Stream Delivery Client Function (SD-C) 204 receives streams on a broadcast channel or an interaction channel via an SD-5 interface 215, or an interface provided in the BDS 112, has a function of decoding the service-protected streams and an error resilience function for FEC-applied streams, and can also have a function (for example, media synchronization function) necessary for reception of the streaming service. In addition, the SD-C 204 can have a function capable of reporting a reception error rate for the received streaming service according to capability of the mobile terminal. Herein, the term "capability of the terminal" refers to the capability of communicating with the SD 203 or the BDS 112 using a cellular network or other networks.

TABLE 3

| No. | Interface | Reference point | Description |
|---|---|---|---|
| 211 | SD-1 | BCAST-1 | Delivery of an unprocessed stream for BCAST streaming Service |
| | | | Delivery of stream with media type and CODEC supported by BCAST |
| 212 | SD-2 | BCAST-2 | Delivery of a stream having BCAST standard media type and CODEC |
| | | | Delivery of stream attributes to Stream Distribution Function in BCAST Service Distribution/Adaptation |
| 215 | SD-5 | BCAST-5 | Unidirectional delivery of a BCAST-standardized stream. |
| | | | Unidirectional delivery of a stream, which is adapted to BDS specific condition(.e.g a data rate supported by BDS) |
| | | | Unidirectional delivery of in-band signaling for Stream Distribution(e.g. signaling used for stream reception) |
| 216 | SD-6 | BCAST-6 | Delivery of report about a stream reception |
| | | | Delivery of request from terminal e.g. request for the retransmission of a whole stream |
| 217 | SD-B1 | BCAST-1 | Delivery of a stream to BDS |
| | | | Delivery of a protected stream to BDS |
| | | | Delivery of a stream attribute to determine bearers used for stream distribution |

TABLE 3-continued

| No. | Interface | Reference point | Description |
|---|---|---|---|
| | | | Delivery of bearer information used for a stream distribution |
| | | | Delivery of a BDS specific profiles for the adaptation of Stream to BDS |

Note:
If BDS service distribution does not exist, then x-1 and/or x-2 can be used for the same purpose As described with reference to FIG. 2, the functional entities for stream distribution are defined. However, definitions of (i) how to actually perform stream distribution, (ii) which control messages should be delivered between the functional entities for actual stream distribution, and (iii) how the functions to be provided in the Stream Distribution Function should be implemented.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for efficiently delivering streams in a mobile broadcast system.

It is another object of an exemplary embodiment of the present invention to provide an apparatus and method in which upon receiving a stream, a user or user terminal reports the receipt of the stream in a mobile broadcast system.

It is further an object of an exemplary embodiment of the present invention to provide an apparatus and method for appropriately translating a BCAST stream into a BDS-specific stream in response to a request of a BDS in a mobile broadcast system.

It is yet another object of an exemplary embodiment of the present invention to provide an apparatus and method for delivering a stream to a BDS and allowing the BDS to reconstruct the stream into a BDS-specific stream and deliver the BDS-specific stream to a plurality of users or user terminals in a mobile broadcast system.

It is still another object of an exemplary embodiment of the present invention to provide an apparatus and method for notifying the start of stream delivery to a plurality of user or user terminals in a mobile broadcast system.

According to one aspect of exemplary embodiments the present invention, there is provided a method for delivering a stream in a mobile broadcast system that receives stream contents of broadcast services (BCAST) from a content creation and provides the broadcast services to at least one terminal via at least one of a broadcast distribution system (BDS) and an interaction network. The method comprises delivering, by a stream application function (SA), a stream comprising an attribute from content creation to a stream delivery function (SD); sending, by the stream delivery function, a request for bearer assignment to a BDS service distribution in order to deliver the stream; assigning, by the BDS service distribution, bearers used for stream delivery and sending a response comprising information on the assigned bearers to the stream delivery function; and delivering, by the stream delivery function, a BCAST streaming service to a stream delivery client function in the terminal over a broadcast channel.

According to another aspect of exemplary embodiments the present invention, there is provided a method for delivering a stream in a mobile broadcast system that receives stream contents of broadcast services (BCAST) from a content creation and provides the broadcast services to at least one terminal via at least one of a broadcast distribution system (BDS) and an interaction network. The method comprises delivering, by a stream application function (SA), a stream comprising an attribute from the content creation to a stream delivery function (SD); delivering, by the stream delivery function (SD), the stream to a BDS service distribution; and delivering, by the BDS service distribution, the stream to a stream delivery client function in the terminal.

According to yet another aspect of the present invention, there is provided a method for sending a report on stream reception at a terminal in a mobile broadcast system that receives stream contents of broadcast services (BCAST) from a content creation and provides the broadcast services to at least one terminal via at least one of a broadcast distribution system (BDS) and an interaction network. The method comprises receiving, by a stream delivery function, a report on stream reception, comprising reception quality, from a stream delivery client function in the terminal via the interaction network; analyzing, by the stream delivery function, the report on the stream reception; and sending, by the stream delivery function, a report on stream reception to a BDS service distribution to improve stream reception quality.

According to yet another aspect of exemplary embodiments the present invention, there is provided a method for sending a report on stream reception at a terminal in a mobile broadcast system that receives stream contents of broadcast services (BCAST) from a content creation and provides the broadcast services to at least one terminal via at least one of a broadcast distribution system (BDS) and an interaction network. The method comprises receiving, by a BDS service distribution, a report on stream reception, comprising reception quality, from a stream delivery client function in the terminal via the interaction network; analyzing, by the BDS service distribution, the report on the stream reception; and sending, by the BDS service distribution, a report on stream reception to a stream delivery function to improve stream reception quality.

According to still another aspect of exemplary embodiments the present invention, there is provided a system for delivering a stream in a mobile broadcast system that receives stream contents of broadcast services (BCAST) from a content creation and provides the broadcast services to at least one terminal or one group of terminals via at least one of a broadcast distribution system (BDS) and an interaction network. The system comprises a stream application function for, delivering a stream to a stream delivery function; the stream delivery function for sending a request for bearer assignment to a BDS service distribution in order to deliver the stream, and delivering the stream to a stream delivery client function in the terminals; and the BDS service distribution for assigning bearers used for stream delivery and sending a response with information on the assigned bearers to the stream delivery function.

According to still another aspect of exemplary embodiments the present invention, there is provided a system for delivering a stream in a mobile broadcast system that receives stream contents of broadcast services (BCAST) from a content creation and provides the broadcast services to at least one terminal via at least one of a broadcast distribution system (BDS) and an interaction network. The system comprises a stream application function for, delivering a the translated stream to a stream delivery function; the stream delivery function for delivering the stream to a BDS service distribution; and the bds service distribution for delivering the stream to a stream delivery client function in the terminal.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention proposes a method for stably delivering a stream in stream distribution and delivering a User Report-related message upon receipt of the stream.

Figure 1:
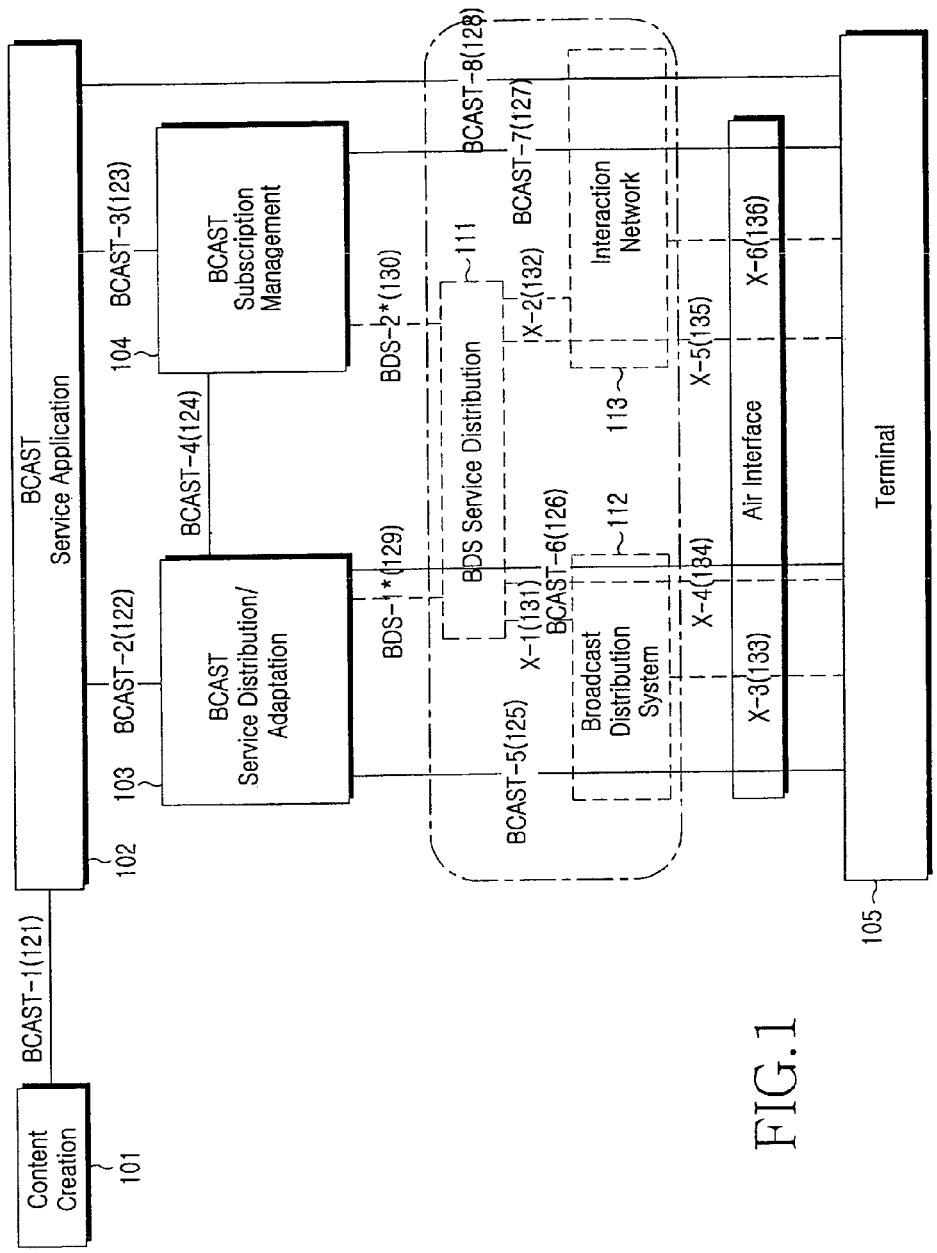
FIG. 1 is a diagram illustrating a logical architecture of OMA BCAST.
Figure 2:
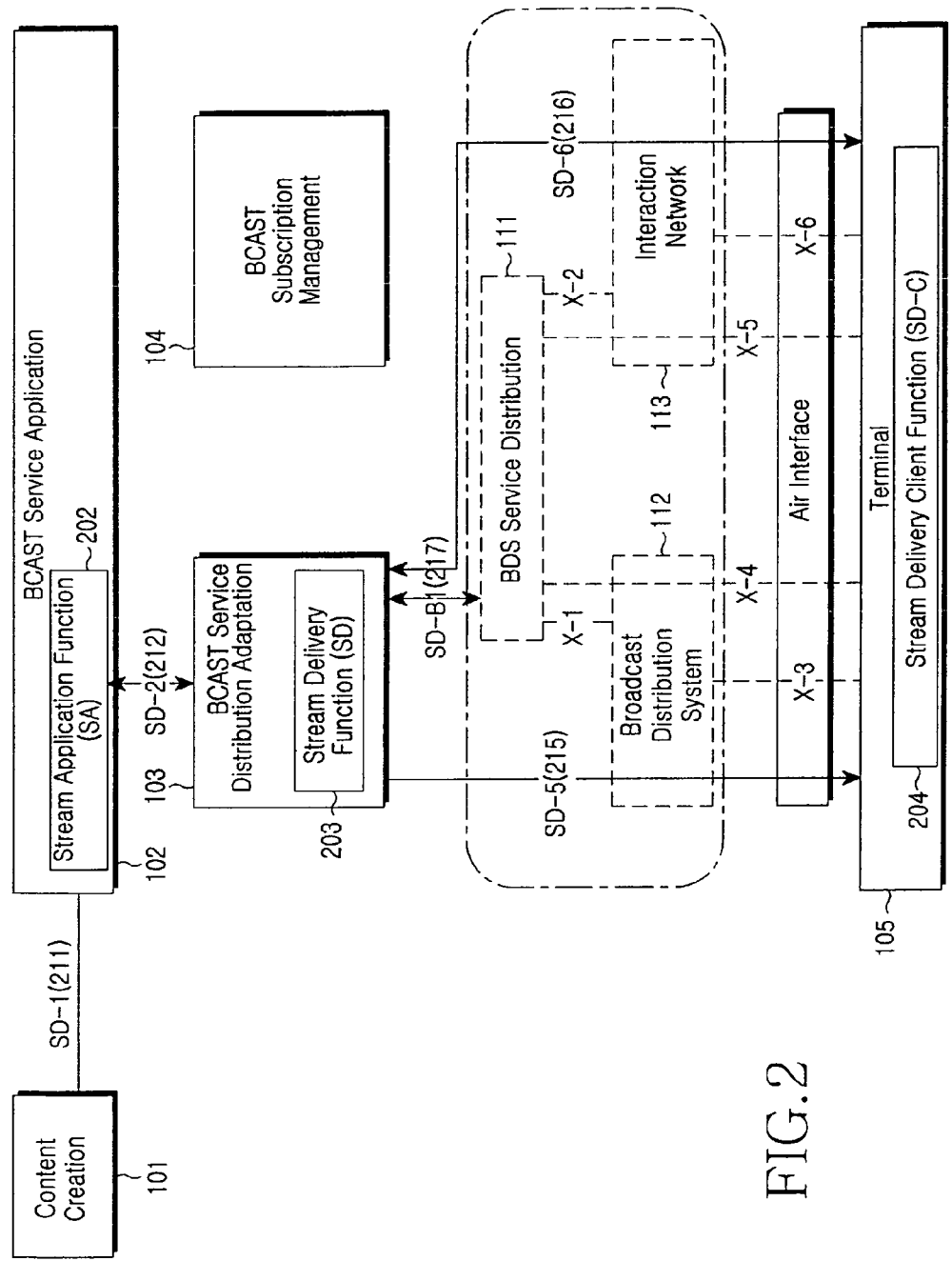
FIG. 2 is a diagram illustrating architecture for a Stream Distribution Function of OMA BCAST.

The present invention proposes a method for delivering a Stream Distribution-related message based on the OMA Stream Distribution Architecture shown in FIG. 2.

For convenience, the entities and names defined in OMA which is a standard organization for mobile application will be used herein, but the present invention is not limited thereto.

Figure 3:
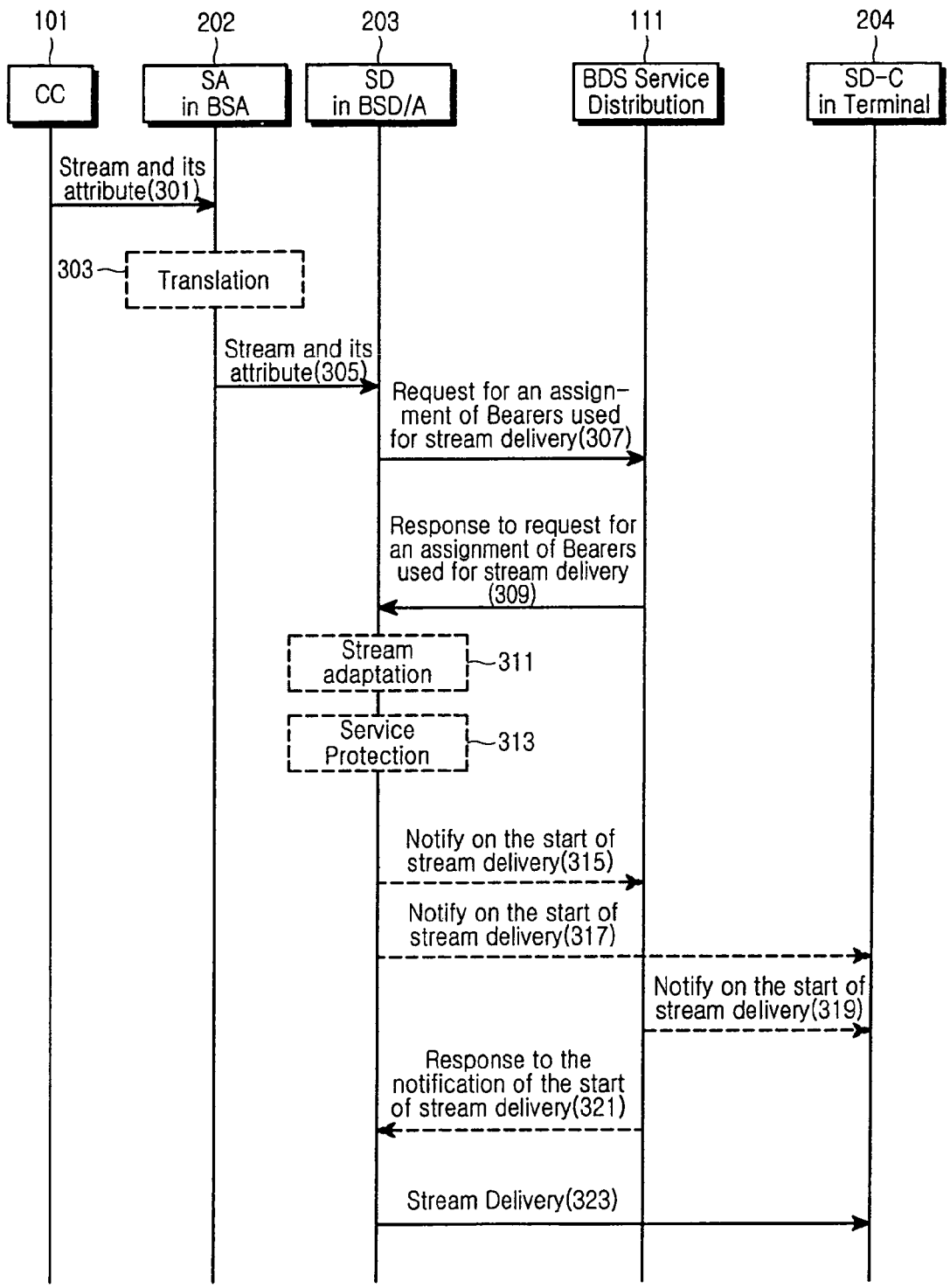
FIG. 3 is a message flow diagram in which OMA BCAST directly delivers a stream over a broadcast channel according to an exemplary embodiment of the present invention.

FIG. 3 is a message flow diagram in which OMA BCAST directly delivers a stream over a broadcast channel according to an exemplary embodiment of the present invention. A CS 101, BSA 102, BSD/A 103, BDS Service Distribution 111, and terminal 105 are assumed to perform the functions described in Table 1, and an SA 202, an SD 203, and an SD-C 204 perform the same functions as those in the Stream Distribution Architecture described in FIG. 2.

The CS 101 delivers a stream, such as a media type and CODEC information to the SA 202 along with an attribute of the stream in step 301, to provide Stream Delivery Service to users. The SA 202 translates the received stream in step 303, if the received stream is different from a BCAST standard stream, and delivers the stream including BCAST standard media type and CODEC to the SD 203 in step 305. Further, the SA 202 delivers an attribute of the stream to the SD 203 to allow the SD 203 to negotiate bearers used for stream delivery with the BDS Service Distribution 111. The SD 203 delivers a Bearer Assignment Request message for stream delivery to the BDS Service Distribution 111 via an SD-B1 217 in step 307. The Bearer Assignment Request message includes information on Quality-of-Service (QoS) required by BCAST Streaming Service and a required data rate. Based on the request from the SD 203, the BDS Service Distribution 111 assigns bearers to be used by the BCAST Streaming Service and provides the bearer assignment information to the SD 203 in step 309. Further, in the case where the requirements of the BCAST are inappropriate for or incompatible with a BDS or translation is needed due to network circumstances of the BDS, the BDS Service Distribution 111 delivers the requirements to the SD 203, if a required data rate for stream delivery is too high or several BDS-specific media types or CODECs are used for the stream. Upon receiving the bearer information to be used for stream delivery and the requirements from the BDS, the SD 203 performs Stream Adaptation in step 311 to generate a stream meeting the requirements of the BDS. In step 313, the SD 203 performs, when necessary, Service Protection for protecting (encrypting) the bearers used for delivering the BCAST Streaming Service so that the subscribers not subscribed to the BCAST Streaming Service cannot receive the BCAST Streaming Service. The SD 203 notifies the start of stream delivery to the BDS Service Distribution 111 in step 315. When necessary or when the user makes the request during its service subscription, the SD 203 may notify the start of stream delivery to the SD-C 204 in step 317. In the stream delivery notification method, the SD 203 directly notifies distribution of the stream to all subscribers in the service area of the SD-C 204 via the BDS Service Distribution 111 as done in step 317. Alternatively, after step 315, the BDS Service Distribution 111 notifies the start of stream delivery to the SD-C 204 in step 319. In step 317, the SD 203 uses an SD-6 interface 216 in notifying the start of stream delivery to the SD-C 204. If step 315 exits, the BDS Service Distribution 111 sends a response notifying the start of stream delivery to the SD 203 in step 321. After the notification, the SD 203 delivers the service-protected BCAST Streaming Service to the SD-C 204 in the terminal 105 over a broadcast channel via the BDS 112 in step 323. The typical technology available for the Service Protection in step 313 may include Internet Protocol Security (IP SEC) specified in IETF.

Figure 4:
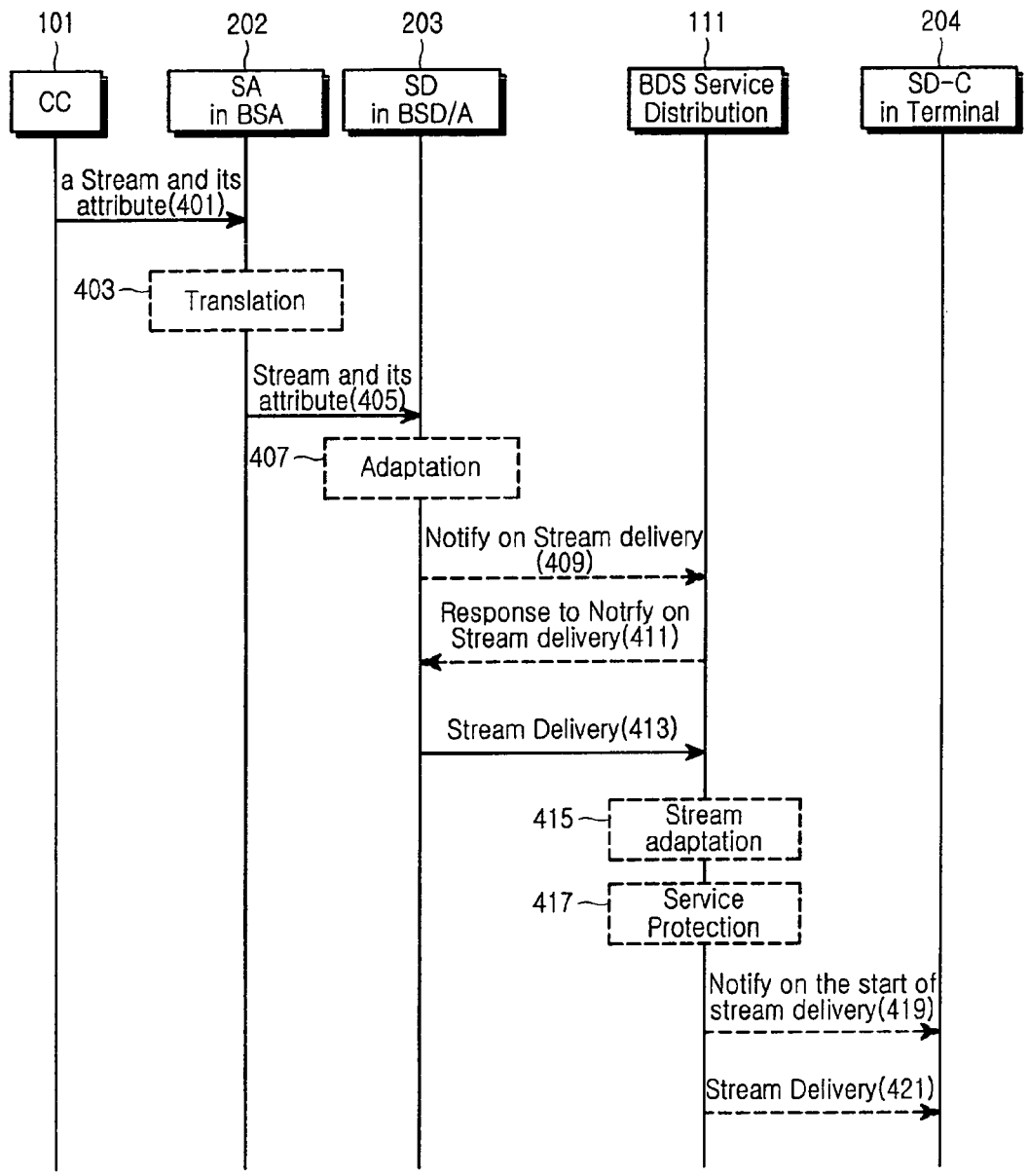
FIG. 4 is a message flow diagram in which OMA BCAST delivers OMA BCAST Streaming Service via a BDS Service Distribution instead of directly delivering the OMA BCAST Streaming Service according to an exemplary embodiment of the present invention.

FIG. 4 is a message flow diagram in which OMA BCAST delivers OMA BCAST Streaming Service via a BDS Service Distribution instead of directly delivering the OMA BCAST Streaming Service according to an exemplary embodiment of the present invention. A CS 101, BSA 102, BSD/A 212, BDS Service Distribution 111, and terminal 105 are assumed to perform the functions described in Table 1, and an SA 202, SD 203, and SD-C 204 perform the functions described in the Stream Distribution Architecture.

To provide Stream Delivery Service to users, the CS 101 delivers a stream such as a media type and CODEC information to the SA 202 along with an attribute for the stream in step 401. Thereafter, if the received stream is different from an OMA BCAST stream in terms of the media type and CODEC, the SA 202 translates the received stream into a BCAST standard stream in step 403, and delivers the BCAST standard stream to the SD 203 in step 405. The SD 203 adapts the OMA BCAST stream to a BDS-specific stream in step 407, and notifies stream delivery to the BDS Service Distribution 111 in step 409. In step 407, the CODEC and media type used for the BDS-specific stream are assumed to have underwent pre-negotiation. Upon receiving the stream delivery notification in step 409, the BDS Service Distribution 111 sends a response with information on the bearers to be used for stream delivery to the SD 203 in step 411. Upon receiving the response with bearer information to be used for stream delivery from the BDS Service Distribution 111, the SD 203 delivers the stream to the BDS Service Distribution 111 in step 413. The BDS Service Distribution 111 performs Stream Adaptation in step 415 to determine a data rate of the stream suitable for the corresponding bearer, and when necessary, performs Service Protection for protecting (encrypting) the bearer used for delivering the BCAST Streaming Service in step 417 so that subscribers not subscribed to the BCAST Streaming Service cannot receive the BCAST Streaming Service. Thereafter, the BDS Service Distribution 111 notifies the start of stream delivery to the SD-C 204 in the terminal 105 in step 419, and then delivers the corresponding stream via reference points X (defined in Third Generation Partnership Project (3GPP) or 3GPP2) in step 421.

Figure 5:
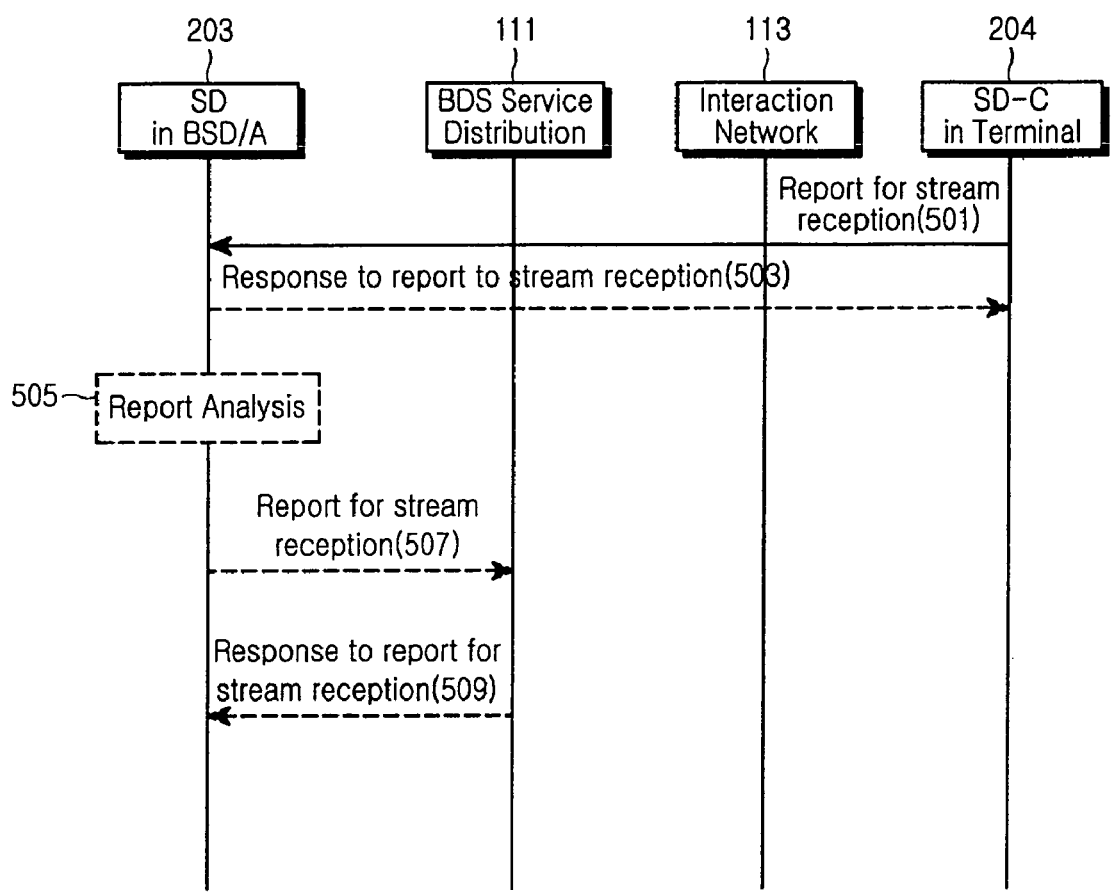
FIG. 5 is a message flow diagram in which when OMA BCAST directly delivers a stream over a broadcast channel, a terminal sends a User Report on stream reception to a BSD/A according to an exemplary embodiment of the present invention.

FIG. 5 is a message flow diagram in which when OMA BCAST directly delivers a stream over a broadcast channel, a terminal sends a User Report on stream reception to a BSD/A according to an exemplary embodiment of the present invention. A BSD/A 103, BDS Service Distribution 111, Interaction Network 113, and terminal 105 are assumed to perform the functions described in Table 1, and an SD 203 and SD-C 204 perform the functions described in the Stream Distribution Architecture.

The SD-C 204 in the terminal 105 sends a report on stream reception to the SD 203 in the BSD/A 103 via the interaction network 113 in step 501. Then the SD 203 may optionally send a response to the report to the SD-C 204 in step 503. The contents of the report may include the reception quality for OMA BCAST Streaming Service. The quality may include an IP packet error rate or a stream block error rate. The SD 203 analyzes the received report in step 505, and may send a report on stream reception to the BDS Service Distribution 111 in step 507 to improve the stream reception quality. After the analysis process, the SD 203 may perform an operation of changing an FEC scheme to improve the stream quality. Based on the report, the BDS Service Distribution 111 determines whether the FEC scheme used in the BDS 112 for delivering the OMA BCAST Streaming Service is appropriate or compatible and whether transmission power allocated for the streaming service is appropriate. If inappropriate, the BDS Service Distribution 111 may use the report during delivery of other streaming services.

The BDS Service Distribution 111 may send a response to the report on stream reception to the SD 203 in step 509.

Figure 6:
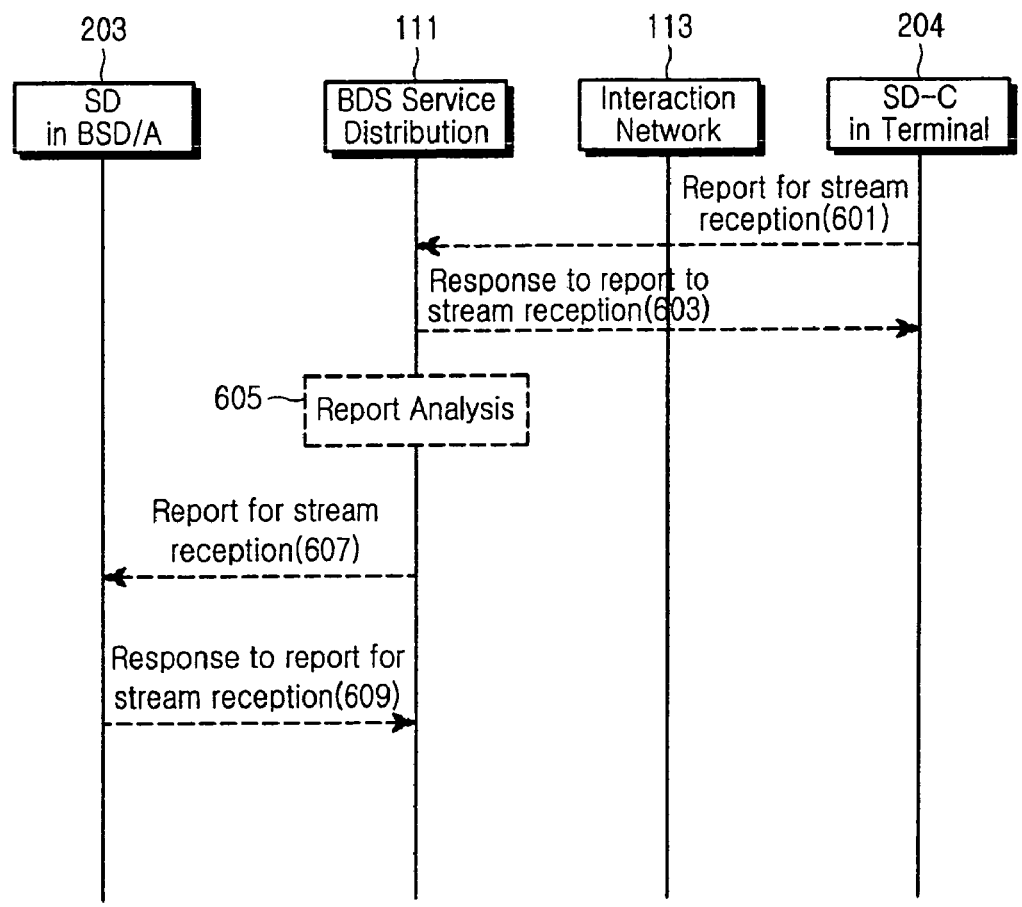
FIG. 6 is a message flow diagram in which a terminal sends a User Report on stream reception to a BDS Service Distribution according to an exemplary embodiment of the present invention.

FIG. 6 is a message flow diagram in which a terminal sends a User Report on stream reception to a BDS Service Distribution according to an exemplary embodiment of the present invention. A BSD/A 103, BDS Service Distribution 111, Interaction Network 113, and terminal 105 are assumed to perform the functions described in Table 1, and an SD 203 and SD-C 204 perform the functions described in the Stream Distribution Architecture.

The SD-C 204 in the terminal 105 may send a report on stream reception to the BDS Service Distribution 111 via the interaction network 113 in step 601, and the BDS Service Distribution 111 may send a response to the report to the SD-C 204 in step 603. The contents of the report may include the reception quality for OMA BCAST Streaming Service. The quality may include an IP packet error rate or a stream block error rate. The BDS Service Distribution 111 may analyze the received report in step 605, and then may send a report on stream reception to the SD 203 in the BSD/A 103 in step 607.

Based on the received report, the SD 203 determines whether the FEC scheme used for delivering the OMA BCAST Streaming Service is appropriate. If inappropriate, the SD 203 may use the report to change the FEC scheme during delivery of other streaming services.

The SD 203 may send a response to the report on stream reception to the BDS Service Distribution 111 in step 609.

As a result, the present invention may efficiently deliver streams in a mobile broadcast system.

Further, according to the exemplary embodiments of the present invention, a user or user terminal receiving a stream may send a report on reception quality of the stream.

In addition, the mobile broadcast system according to exemplary embodiments of the present invention delivers a stream to a BDS and allows the BDS to reconstruct the stream into a BDS-specific stream and deliver the BDS-specific stream to a plurality of users or user terminals.

Moreover, exemplary embodiments of the present invention may notify the start of stream delivery to a plurality of users or user terminals.

According to exemplary embodiments of the present invention, an SD or BDS receives a user report and reduces a reception error rate based on the user report.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A method for delivering a stream in a mobile broadcast system that receives stream contents of broadcast services (BCAST) from a content creation and provides the broadcast services to at least one terminal via at least one of a broadcast distribution system (BDS) and an interaction network, the method comprising:

delivering, by a stream application function(SA), a stream comprising an attribute from the content creation to a stream delivery function (SD);

sending, by the stream delivery function, a request for bearer assignment to a BDS service distribution in order to deliver the stream;

assigning, by the BDS service distribution, bearers used for stream delivery and sending a response comprising information on the assigned bearers to the stream delivery function; and delivering, by the stream delivery function, a BCAST streaming service to a stream delivery client function in a mobile terminal over a broadcast channel.

2. The method of claim 1, further comprising, upon receiving the stream from the content creation, translating, by the stream application function, the received stream to be compatible with the broadcast service.

3. The method of claim 2, wherein the translating of the received stream further comprises, if the stream is different from a BCAST standard stream in terms of a media type and CODEC information, translating the stream to be compatible with the broadcast service.

4. The method of claim 1, further comprising, upon receiving a specific request from the BDS, adapting, by the stream delivery function, the stream to be compatible with the BDS-specific request.

5. The method of claim 1, further comprising, upon receiving a specific request from the BDS, performing protection on the adapted stream.

6. The method of claim 1, wherein the attribute comprises a media type and CODEC information.

7. The method of claim 1, wherein the sending of the request comprises sending the bearer assignment request using an SD-B1 interface.

8. The method of claim 1, further comprising, before the delivering of the BCAST streaming service, notifying, by the stream delivery function, a start of the stream delivery to the stream delivery client function in the terminal via an SD-6 interface.

9. The method of claim 1, further comprising, before the delivering of the BCAST streaming service, notifying, by the stream delivery function, a start of the stream delivery to the stream delivery client function in the terminal via the BDS service distribution.

10. The method of claim 1, further comprising:
receiving, by the stream delivery function, a report on stream reception comprising reception quality from the stream delivery client function in the terminal via the interaction network;
analyzing, by the stream delivery function, the report on the stream reception; and
sending, by the stream delivery function, a report on stream reception to the BDS service distribution to improve stream reception quality.

11. The method of claim 1, further comprising:
receiving, by the BDS service distribution, a report on stream reception comprising reception quality from the stream delivery client function in the terminal via the interaction network;
analyzing, by the BDS service distribution, the report on the stream reception; and
sending, by the BDS service distribution, a report on stream reception to the stream delivery function to improve stream reception quality.

12. A method for delivering a stream in a mobile broadcast system that receives stream contents of broadcast services (BCAST) from a content creation and provides the broadcast services to at least one terminal via at least one of a broadcast distribution system (BDS) and an interaction network, the method comprising:
translating, by a stream application function (SA), the stream to be compatible with the broadcast service if the stream is different from a BCAST standard stream in terms of a media type and CODEC information and delivering the stream comprising an attribute from the content creation to a stream delivery function (SD);
delivering, by the stream delivery function (SD), the stream to a BDS service distribution; and
delivering, by the BDS service distribution, the stream to a stream delivery client function in a mobile terminal.

13. The method of claim 12, further comprising, adapting, by the stream delivery function, the stream to be compatible with the BDS.

14. The method of claim 13, wherein the adapting of the translated stream comprises delivering the adapted stream using an SD-B1 interface.

15. The method of claim 13, wherein the adapting of the translated stream comprises adapting, by the stream delivery function, the stream to be compatible with a BDS-specific CODEC and a media type.

16. The method of claim 12, further comprising, performing, by the BDS service distribution, service protection on the received stream.

17. The method of claim 12, wherein the attribute includes a media type and CODEC information.

18. The method of claim 12, further comprising, notifying, by the stream delivery function, a start of the stream delivery to the BDS service distribution.

19. The method of claim 12, further comprising, notifying, by the BDS service distribution, a start of the stream delivery to the stream delivery client function in the terminal.

20. The method of claim 12, further comprising:
receiving, by the stream delivery function, a report on stream reception comprising reception quality from the stream delivery client function in the terminal via the interaction network;
analyzing, by the stream delivery function, the report on the stream reception; and
sending, by the stream delivery function, a report on stream reception to the BDS service distribution to improve stream reception quality.

21. The method of claim 12, further comprising:
receiving, by the BDS service distribution, a report on stream reception comprising reception quality from the stream delivery client function in the terminal via the interaction network;
analyzing, by the BDS service distribution, the report on the stream reception; and
sending, by the BDS service distribution, a report on stream reception to the stream delivery function to improve stream reception quality.

22. A method for sending a report on stream reception at a terminal in a mobile broadcast system that receives stream contents of broadcast services (BCAST) from a content creation and provides the broadcast services to at least one terminal via at least one of a broadcast distribution system (BDS) and an interaction network, the method comprising:
receiving, by a stream delivery client function in a mobile terminal, a stream comprising an attribute from a stream delivery function via bearers assigned in a BDS service distribution;
receiving, by the stream delivery function, a report on stream reception comprising reception quality from the stream delivery client function via the interaction network;
analyzing, by the stream delivery function, the report on the stream reception; and
sending, by the stream delivery function, a report on stream reception to a BDS service distribution to improve stream reception quality.

23. The method of claim 22, further comprising, before the analyzing of the report, sending, by the stream delivery function, a response to the report on the stream reception to the stream delivery client function in the terminal.

24. The method of claim 22, further comprising, after the analyzing of the report, changing a forward error correction scheme to improve stream quality.

25. The method of claim 22, wherein the sending of the report further comprises sending, by the BDS service distribution, a response to the report on the stream reception.

26. A method for sending a report on stream reception at a terminal in a mobile broadcast system that receives stream contents of broadcast services (B CAST) from a content creation and provides the broadcast services to at least one terminal via at least one of a broadcast distribution system (BDS) and an interaction network, the method comprising:
   receiving, by a stream delivery client function in a mobile terminal, a stream comprising an attribute from a BDS service distribution;
   receiving, by the BDS service distribution, a report on stream reception comprising reception quality, from the stream delivery client function via the interaction network;
   analyzing, by the BDS service distribution, the report on the stream reception; and
   sending, by the BDS service distribution, a report on stream reception to a stream delivery function to improve stream reception quality,
   wherein the stream is translated, by a stream application function (SA), to be compatible with the broadcast service if the stream is different from a BCAST standard stream in terms of a media type and CODEC information.

27. The method of claim 26, wherein the receiving of the report further comprises sending, by the BDS service distribution, a response to the report on the stream reception to the stream delivery client function in the terminal.

28. The method of claim 26, further comprising, after the analyzing of the report, changing a forward error correction scheme to improve stream quality.

29. The method of claim 26, wherein the sending of the report further comprises sending, by the stream delivery function, a response to the report on the stream reception to the BDS service distribution.

30. A system for delivering a stream in a mobile broadcast system that receives stream contents of broadcast services (BCAST) from a content creation and provides the broadcast services to at least one terminal via at least one of a broadcast distribution system (BDS) and an interaction network, the system comprising:
   a stream application function for delivering a stream to a stream delivery function;
   the stream delivery function for sending a request for bearer assignment to a BDS service distribution in order to deliver the stream, and delivering the stream to a stream delivery client function in a mobile terminal; and
   the BDS service distribution for assigning bearers used for stream delivery and sending a response with information on the assigned bearers to the stream delivery function.

31. The system of claim 30, wherein the stream application function translates the stream to be compatible with the broadcast service, upon receiving a stream with its attribute from the content creation.

32. The system of claim 30, wherein the stream delivery function, upon receiving a specific request from the BDS, adapting the stream to be compatible with the BDS-specific request.

33. The system of claim 30, wherein the stream delivery function performs protection on the stream.

34. The system of claim 30, wherein the stream delivery function receives a report on stream reception comprising reception quality from the stream delivery client function in the terminal via the interaction network, analyzes the report on the stream reception, and sends a report on stream reception to the BDS service distribution to improve stream reception quality.

35. The system of claim 30, wherein the BDS service distribution receives a report on stream reception comprising reception quality from the stream delivery client function in the terminal via the interaction network, analyzes the report on the stream reception, and sends a report on stream reception to the stream delivery function to improve stream reception quality.

36. A system for delivering a stream in a mobile broadcast system that receives stream contents of broadcast services (BCAST) from a content creation and provides the broadcast services to at least one terminal via at least one of a broadcast distribution system (BDS) and an interaction network, the system comprising:
   a stream application function for translating the received stream to be compatible with the broadcast service if the stream is different from a BCAST standard stream in terms of a media type and CODEC information and delivering the stream to a stream delivery function;
   the stream delivery function for delivering the stream to a BDS service distribution; and
   the BDS service distribution for delivering the stream to a stream delivery client function in a mobile terminal.

37. The system of claim 36, wherein the stream delivery function adapts the stream to be compatible with the BDS.

38. The system of claim 36, wherein the BDS service distribution performs service protection on the stream.

39. The system of claim 36, wherein the stream delivery function receives a report on stream reception comprising reception quality from the stream delivery client function in the terminal via the interaction network, analyzes the report on the stream reception, and sends a report on stream reception to the BDS service distribution to improve stream reception quality.

40. The system of claim 36, wherein the BDS service distribution receives a report on stream reception comprising reception quality from the stream delivery client function in the terminal via the interaction network, analyzes the report on the stream reception, and sends a report on stream reception to the stream delivery function to improve stream reception quality.

* * * * *